US005427010A

United States Patent [19]

Hoshino

[11] Patent Number: 5,427,010

[45] Date of Patent: Jun. 27, 1995

[54] BEATER FOR DRUM PEDALS

[75] Inventor: Yoshiki Hoshino, Aichi, Japan

[73] Assignee: Hoshino Gakki Co., Ltd., Japan

[21] Appl. No.: 125,313

[22] Filed: Sep. 21, 1993

[30] Foreign Application Priority Data

Jan. 12, 1993 [JP] Japan .......... 5-003388 U

[51] Int. Cl.[6] .......... G01D 13/02

[52] U.S. Cl. .......... 84/422.1

[58] Field of Search .......... 84/422.1

[56] References Cited

U.S. PATENT DOCUMENTS 1,775,283 9/1930 Juster .......... 84/422.1
2,896,492 7/1959 Dane .......... 84/422.1
4,023,461 5/1977 Brandolino .......... 84/422.1
5,301,592 4/1994 Johnston .......... 84/422.1

*Primary Examiner*—Michael L. Gellner
*Assistant Examiner*—Patrick J. Stanzione
*Attorney, Agent, or Firm*—Ostrolenk, Faber, Gerb & Soffen

[57] ABSTRACT

In order that the beating surface of the main beater body of a drum beater on a drum pedal will squarely and flatly beats against a drum head, the beating surface of the beater body is inclined with respect to the swingable beater body support rod at an angle selected so that the beating surface orientation will be approximately the same orientation, i.e. the same plane, as the drum head surface at the moment of beating. A similar beating surface may be formed on the rear side of the beater head.

9 Claims, 7 Drawing Sheets

BEATER FOR DRUM PEDALS

BACKGROUND OF THE INVENTION

This invention relates to the structure of a beater for a drum pedal and particularly to the beater body.

An example of the ordinary drum pedal is shown in FIGS. 7 and 8. The drum pedal 100 comprises a beater 110 and an operating part 120 operated by a pedal 130. The drum pedal 100 is fixed to a bass drum 140 by a fixing member 105, e.g. a known clamp, etc. The drum pedal has a base 101, with a support at the base near the clamp. A spring 103 returns the beater away from the drum head. At the rear of the drum, there is a drum stand S.

The beater 110 comprises a rod 111 with a main beater body 112 at the end of the rod. The rod 111 is fixed to a transversely extending beater rotating shaft 121 of the operating part 120.

The beater body 112 may be of felt, etc., with the rod 111 inserted into it, and the body 112 is installed at the tip of the rod 111 by a tightening nut 113.

The beater operation is controlled by the operating part 120 comprising a beater rotation shaft 121 extending transversely, a wheel 122 on the shaft and a chain 123 trained on the wheel. The beater rotation shaft 121 is freely rotatably supported at the top of the support 102. The rod 111 for supporting the beater head and a wheel 122 that rotates integrally with the rod 111 are installed on the shaft 121. The wheel 122 comprises a sprocket or a partial sprocket, etc. around its periphery. The chain 123 has one end fixed to the wheel 122 so that the chain is wound on and off the wheel as the wheel rotates. The other end of the chain 123 is connected to the tip of a foot pedal 131 of the pedal part 130. As shown in FIGS. 7 and 8, the chain 123 is pulled down as the foot pedal 131 is stepped on which rotates the wheel 122. That in turn rotates the rod 111 which swings the beater body 112 to beat the drum head 141 of the bass drum 140.

As it is constructed, however, the beater part 110 has a tendency for the actual beating and contacting part between the beater body 112 and the drum head 141 to become quite small, even dot-like, as shown by a two-dot chain in FIG. 8. As a result, the impact at beating becomes weak and a powerful sound quality is difficult to obtain. Since the beater body 112 as a whole may consist of felt, there may be a problem involving the higher cost of the beater.

SUMMARY OF THE INVENTION

An object of the invention is to provide a beater for a drum pedal which is not only capable of producing a powerful sound quality but is also inexpensive. Another object of the invention is to enlarge the surface area of contact of the beater head with the drum head surface, as compared with known beater arrangements.

In the invention, a beater for the drum pedal is designed such that the beater body which is located at the tip of a support rod that is rotated by the operation of the pedal, includes a beating surface that is inclined at a selected angle with respect to the rod so that the beating surface is approximately parallel to the drum head surface at the moment of beating.

Other objects and features of the invention are explained below with reference to the attached drawings.

DESCRIPTION OF THE PREFERRED EMBODIMENTS

Figure 1:
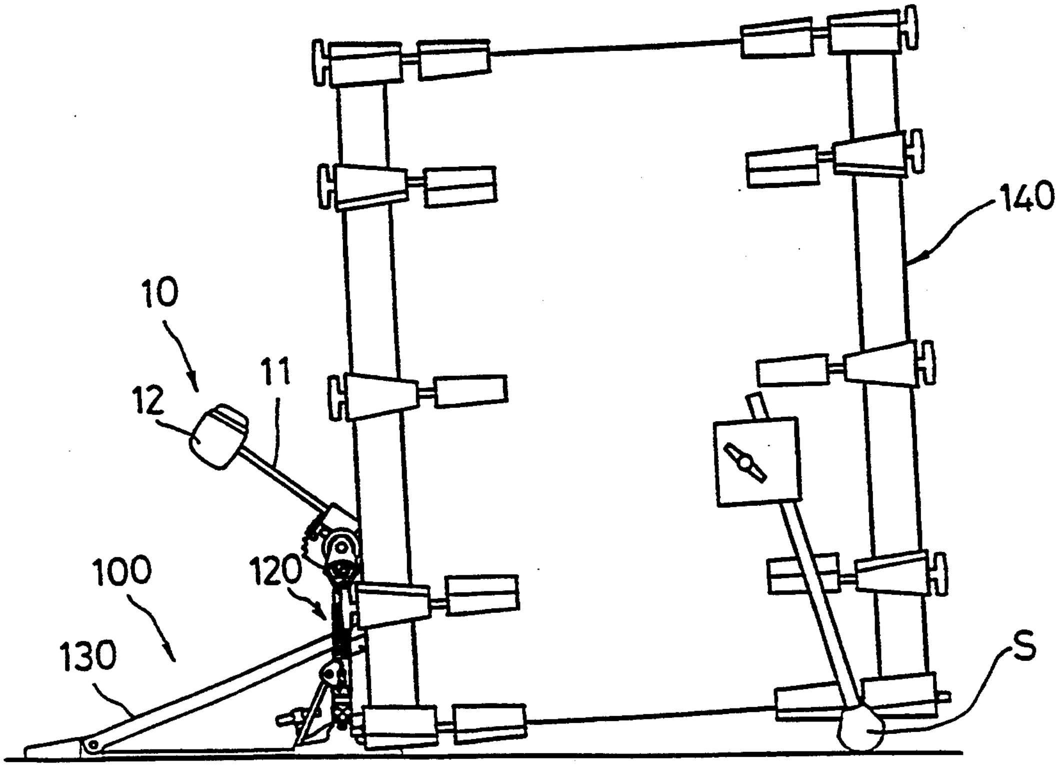
FIG. 1 is a side view of a drum pedal in which the beater according to the invention is incorporated.
Figure 2:
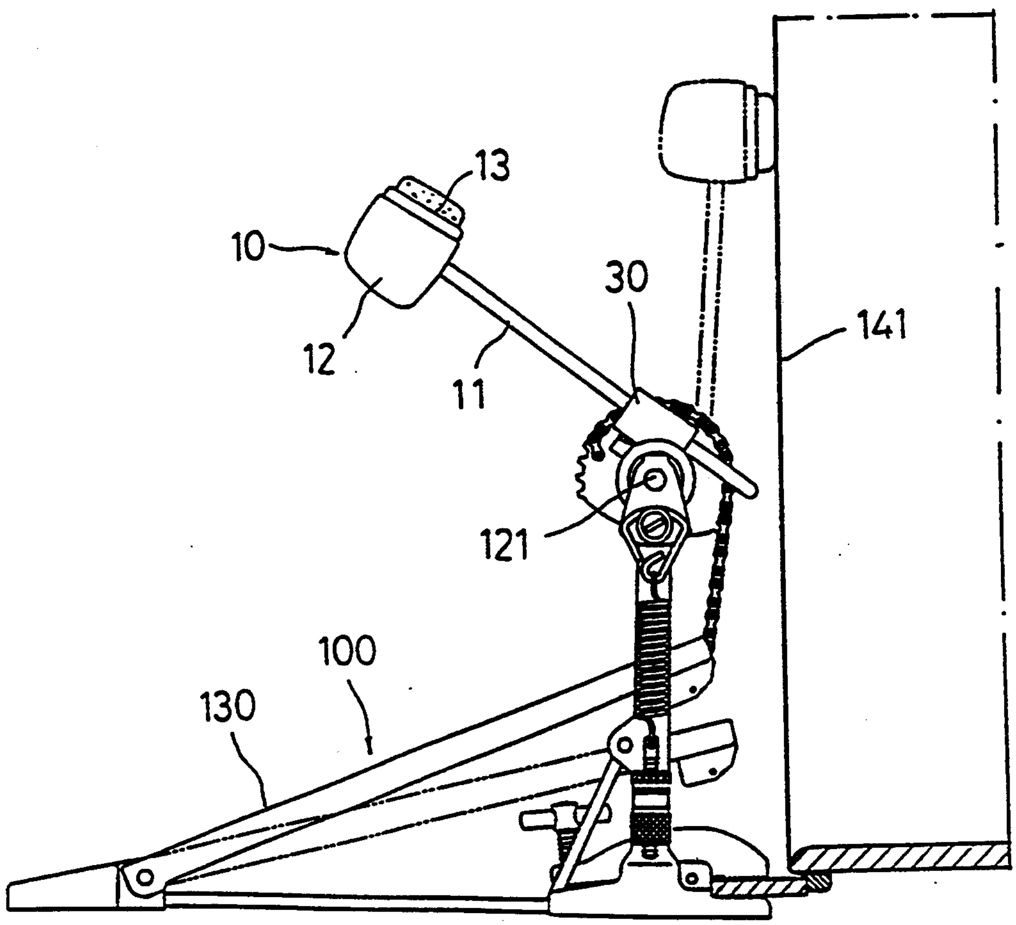
FIG. 2 is an expanded view of the drum pedal.
Figure 7:
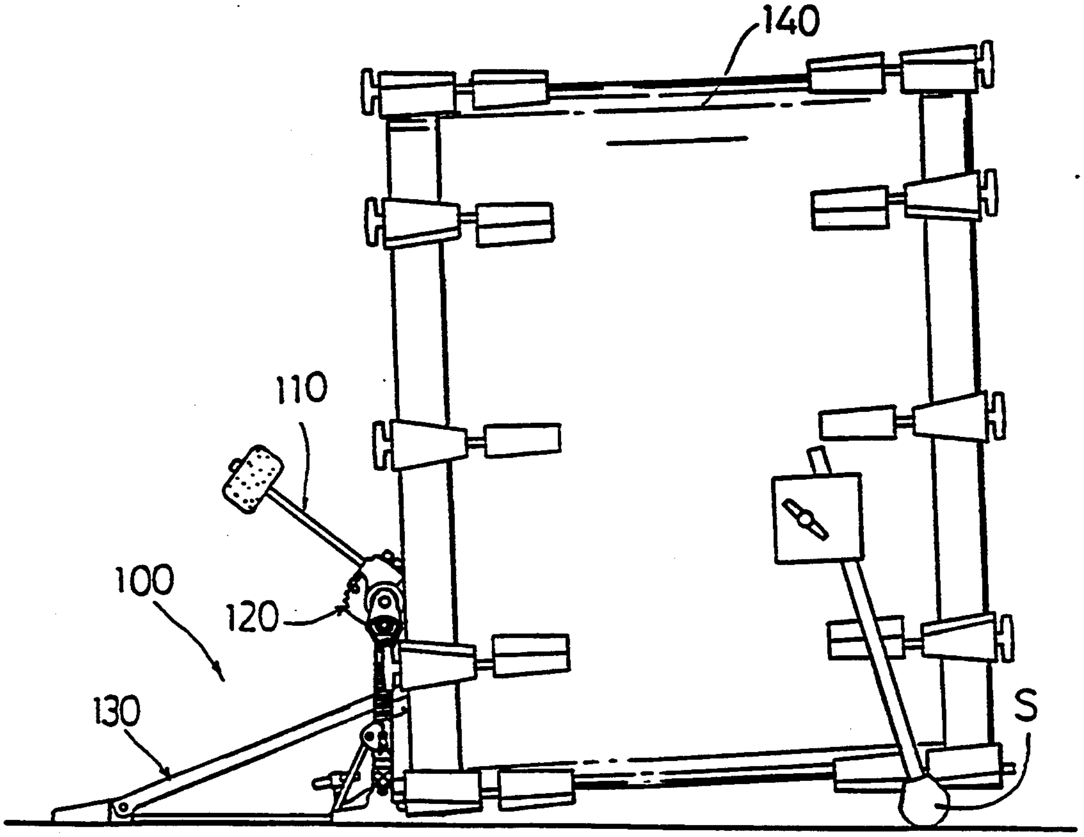
FIG. 7 PRIOR ART
FIG. 7.is a side view of a bass drum showing a prior art beater for a drum pedal.
Figure 8:
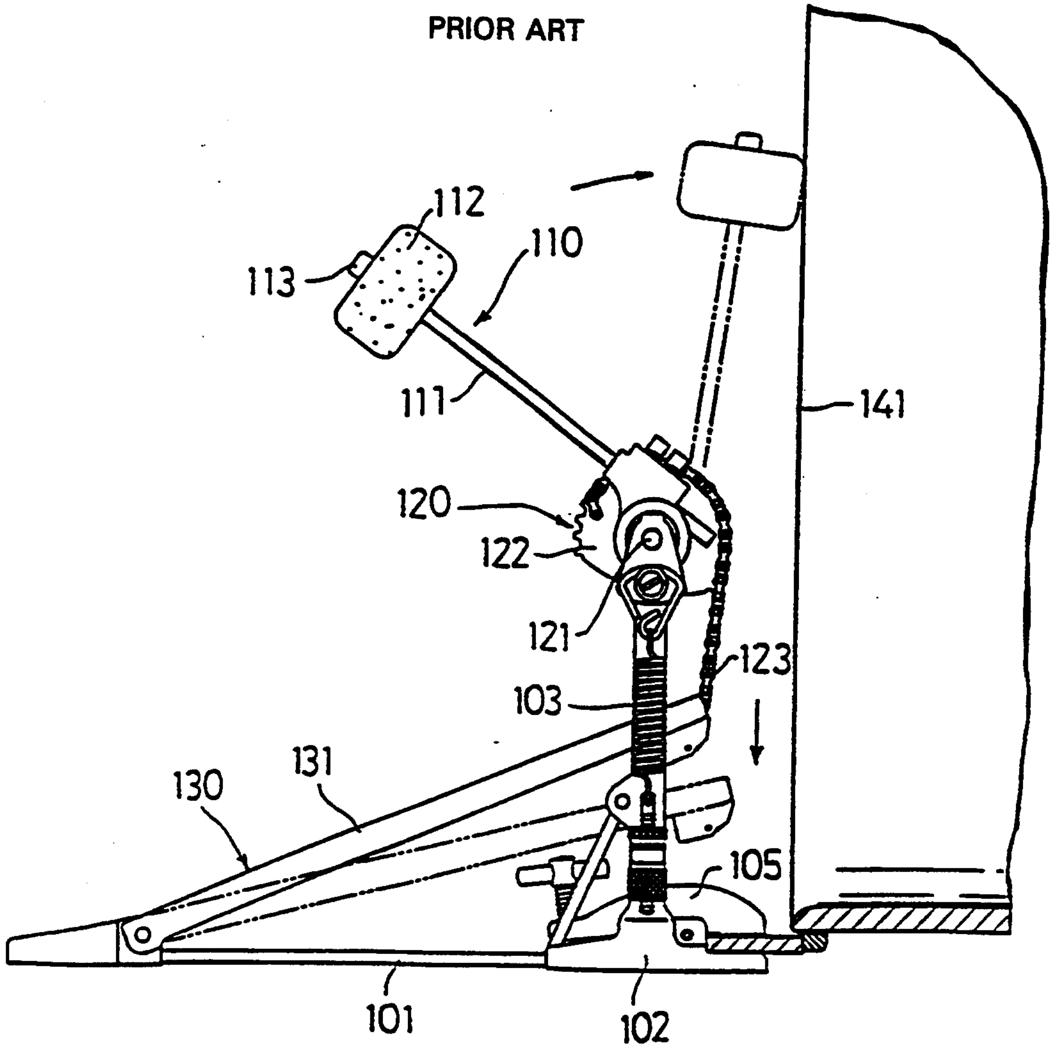
FIG. 8 PRIOR ART
FIG. 8 is another view of the drum pedal of FIG. 7.

In FIGS. 1 and 2, the beater structure 10 according to this invention is formed on a conventional drum pedal 100, of the type which is also shown in FIGS. 7 And 8. The drum head 141 of the bass drum 140 is beaten by the beating surface of the beater body. The same reference numbers as in FIGS. 7 and 8 are used to indicate the same elements.

The beater structure 10 comprises a support rod 11 and a beater body 12 that is installed integrally at the tip of the rod 11. The rod 11 is fixed to the transversely extending beater rotating shaft 121 through a known installation member 30.

Figure 3:
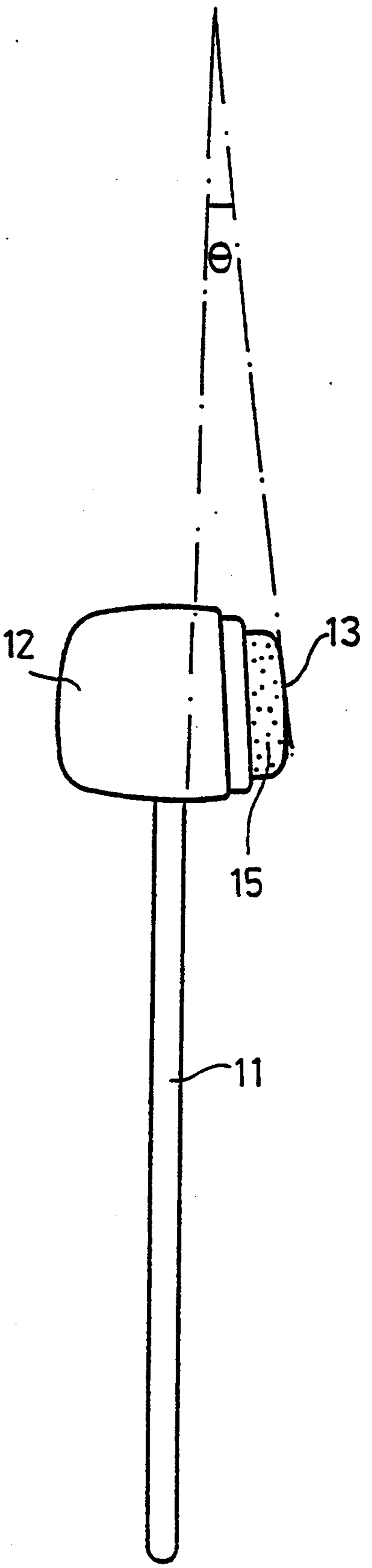
FIG. 3 is a side view of the beater.
Figure 4:
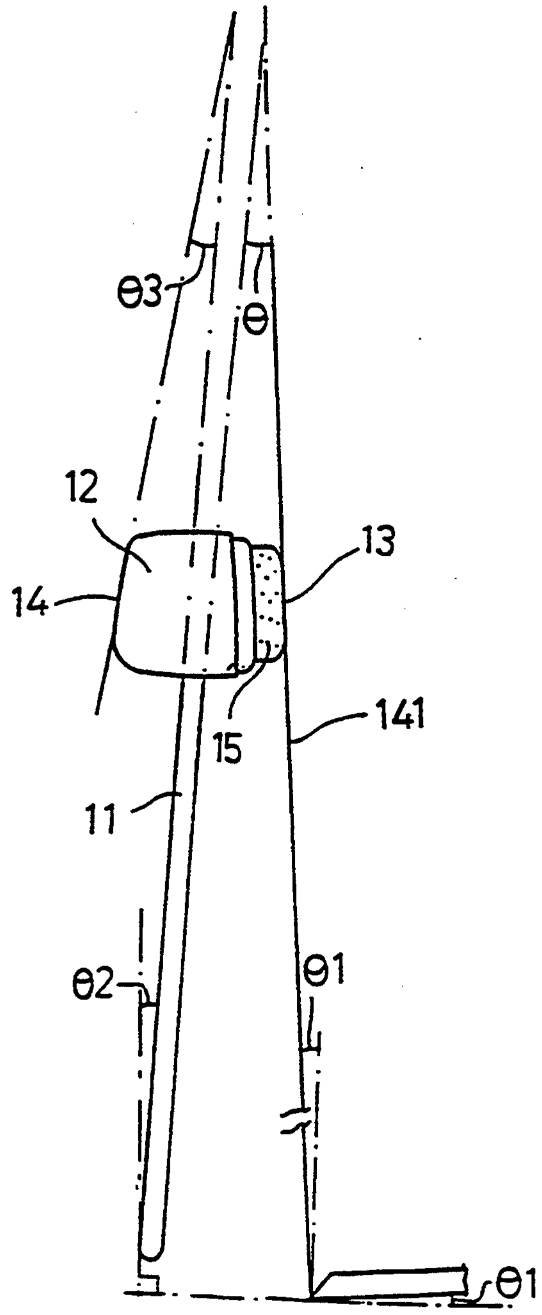
FIG. 4 is a side view showing the state when the drum head is being beaten by the beater and also illustrates a slightly modified beater structure.

In FIGS. 3 and 4, the beater body 12 may be made of a plastic, but has a beating surface 13 that is defined by a beating member 15 comprised of a body of a felt material, etc. which is formed on the front of the body 12. The beating surface 13 is an inclined surface having a suitable angle of inclination Θ (theta) as compared with the axis of the rod 11. The angle (theta) is approximately equal to the sum of the angle of incline (theta 1) of the drum 140 that has been fixed to tilt somewhat to the front by a drum stand S and the angle of incline (theta 2) of the rod 11 at the time when the main beater body 12 beats the drum head 141. The angle of incline Θ (theta) of the beating surface 13 is selected for causing the beating surface 13 to contact the drum head 141 flat. As the beating surface 13 of the main beater body 12 beats against the drum head 141, the incline of the drum head 141 approximately agrees with the incline of the beating surface 13. In other words, the beating surface is in a plane which is oriented parallel to or in the same plane as the drum head at the moment of beating. This makes it possible for the drum head 141 to be beaten by the beating surface 13 of the beater as a whole, which produces a powerful attach sound with a clear-cut contour. In addition, the impact at the time of beating is powerful. Moreover, the drum head 141 does not develop a localized dent at a single small point of contact and is not deformed through beating just against one small area thereof so that the durability of the drum head is improved correspondingly.

The angle of incline (theta) of the inclined beating surface 13 can be suitably selected in conformity with the incline of the drum head as it is installed and the incline of the rod 11 at the time when the drum head is beaten. In this example, the angle of incline (theta 1) of the drum 140 is two degrees and, therefore, the angle of incline of the drum head 141 is also two degrees. Since the angle of incline of the rod 11 at the moment when the drum head 141 is being beaten is adjusted to two degrees, on the other hand, the angle of incline of the beating surface 13 of the beater body 12 with 10 respect to the rod 11 is formed at four degrees.

FIG. 4 shows a beating surface 14 comprising an inclined surface having a similar angle of incline (theta 3) located on the back of beater 12. This makes it alternatively possible to beat the drum with the rear side of the beater body. This makes it possible to differentiate between two tone colors produced either by the felt surface at the front or the plastic surface at the rear by using a single beater. In addition, various beating feelings and tone colors can be obtained by building the beating member 15 with a wooden plate or a rubber plate, etc. at the front beating side instead of the felt.

Figure 5:
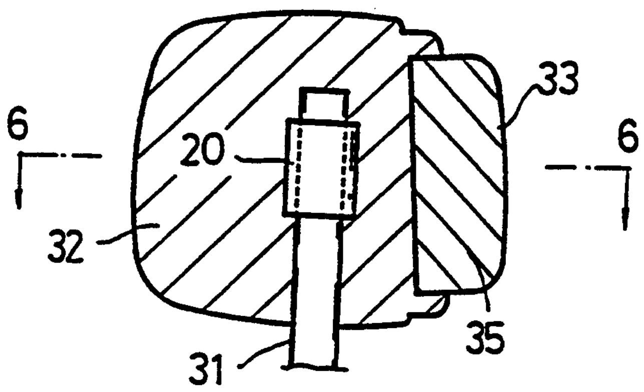
FIG. 5 is a cross section through another embodiment of a beater head.
Figure 6:
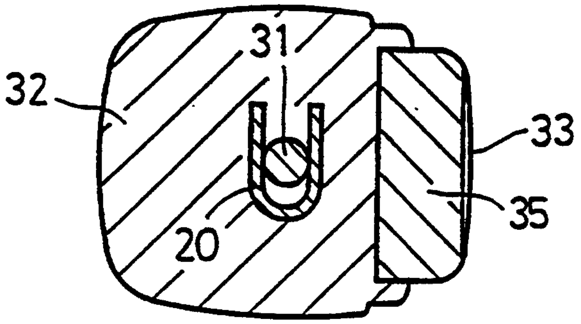
FIG. 6 is a cross section cut along line 6—6 in FIG. 5.

It is possible to provide a weight 20 inside the beater body by bending a metal plate in such a way as to form a U shaped cross section at the tip of the rod 31, as shown in FIGS. 5 and 6, and to form it integrally with the beater body 32. This enables adjustment of the weight of the beater body 32. The weight 20 is formed suitably in conformity with the weight of the beater that is required and is fixed to the rod 31 by welding, etc.

A beating surface 33 of the beating member 35 is shown. The member 35 is an insert in the beater body 32.

Because the incline of the beating surface of the beater body agrees with the incline of the drum head at the moment of beating, it becomes possible for the entire beating surface of the beater to beat the surface of the drum head producing a powerful tone quality of high impact at the time of beating. In the beater body, further, that part which is constituted of felt may be small, enabling the manufacturing cost to be held down.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A beater for a drum pedal comprising:

a rod adapted to be swung toward and away from a drum head; a beater body on the rod for being swung by the rod; the beater body having a front side and a beating surface at the front side of the beater body to be swung by the rod against the drum head, and the beating surface is two-dimensional essentially planar and inclined at an angle with respect to the rod so that the beating surface is parallel to and flat against the surface of the drum head at the moment the rod swings the beating surface against the drum head.

2. The beater of claim 1, further comprising means supporting the rod for swinging around a pivot axis transverse to the axis of the rod whereby the rod swings the beater body toward and away from the drum head by swinging it around the axis.

3. The beater of claim 2, wherein the beater body is of one material and the beating surface thereof is of another drum beating material.

4. The beater of claim 1, wherein the beating surface is inclined at an angle to the axis of the rod.

5. The beater of claim 4, wherein the beating surface is inclined at an angle of approximately 4° to the axis of the rod.

6. The beater of claim 1, wherein the beater body has a rear side opposite to the front side, and a respective beating surface on both of the front and the rear sides, and each of the beating surfaces are the inclined surfaces thereof.

7. A beater for a drum pedal comprising:

a rod adapted to be swung toward and away from a drum head; a beater body on the rod for being swung by the rod; the beater body having a beating surface which is to be swung by the rod against the drum head, and the beating surface is essentially planar and inclined at an angle with respect to the rod so that the beating surface is parallel to and flat against the surface of the drum head at the moment the rod swings the beating surface against the drum head, the beater body having a front side and an opposite rear side and a respective beating surface on both the front and the rear sides, and each of the beating surfaces are the inclined surfaces thereof, wherein a first beating surface is comprised of a first drum head beating material and a second beating surface is comprised of a second, different drum head beating material.

8. The beater of claim 7, wherein one of the beating surfaces is comprised of a felt material.

9. A drum pedal comprising:

a base for being placed next to a drum head, a support upstanding from the base, a beater rod support shaft having an axis generally parallel to the surface of the drum head and supported on the support;

a drum beater for a drum pedal comprising a rod adapted to be swung toward and away from a drum head, a beater body on the rod for being swung by the rod, the beater body having a front side and a beating surface at the front side of the beater body to be swung by the rod against the drum head, and the beating surface is two-dimensional essentially planar and inclined at an angle with respect to the rod so that the beating surface is parallel to and flat against the surface of the drum head at the moment the rod swings the beating head surface against the drum head;

a pedal connected with the beater rod support shaft so that operation of the pedal rotates the beater rod support shaft for swinging the rod around the beater rod support shaft to selectively move the beating surface into contact with and away from the drum head.

* * * * *